Patented Sept. 27, 1938

2,131,249

UNITED STATES PATENT OFFICE 2,131,249

CONDENSATION PRODUCTS

Gerhard Balle, Frankfort-on-the-Main, Germany, assignor to I. G. Farbenindustrie Aktiengesellschaft, Frankfort-on-the-Main, Germany No Drawing. Application April 20, 1936, Serial No. 75,506. In Germany August 30, 1932

1 Claim. (Cl. 260—2)

The present invention relates to condensation products.

I have found that condensation products may be obtained by causing aliphatic aldehydes containing more than 6 carbon atoms to act upon compounds of the phenol group in the presence of condensing agents of acid reaction. Aliphatic aldehydes containing more than 6 carbon atoms especially such aliphatic aldehydes containing more than 9 carbon atoms may be prepared, for instance, by the distillation of the calcium salts of the fatty acids contained in natural fats, oils or waxes with calciumformate. In the present process there may be used for instance: Laurylaldehyde, palmitylaldehyde, stearylaldehyde, linoleic acid aldehyde, montanic acid aldehyde, the aldehydes of the sperm oil fatty acids and so on, per se or in mixture with one another. As compounds of the phenol group there may be used, for instance: phenol, cresols and naphthols. The new products obtained are oily to resinlike bodies which are soluble in alcohol, benzene and also drying oils.

The phenols may also be condensed with the aliphatic aldehydes containing more than 6 carbon atoms in the presence of such condensing agents of acid reaction as at the same time have a sulfonating action. There are thus obtained water-soluble condensation products which strongly reduce the surface tension of the water.

The latter process may also be modified in such a manner that the condensation of the phenols is first carried out with the aldehydes named or that it is at least started with these aldehydes and that the reaction product is then treated with agents having a sulfonating action. With the same effect it is also possible first to treat the phenols with agents having a sulfonating action and then to carry out the condensation with the aldehydes in question.

The new products may be employed according to their properties in the lacquer industry, in the textile industry, for instance as textile oils, as cleansing, wetting or dispersing agents and also in the leather industry as tanning or stuffing agents.

The following examples serve to illustrate the invention but they are not intended to limit it thereto; the parts are by weight:

(1) 108 parts of crude cresol are mixed with 92 parts of dodecylaldehyde and into this mixture there are introduced at 15° C. to 20° C. while cooling the vessel from outside 20 parts of hydrochloric acid of 37 per cent strength. After stirring for 24 hours the reaction mass has become viscous; it is washed with hot water until neutral and dehydrated by heating it to 120° C. A soft resin having a weakly yellow color is obtained.

(2) 94 parts of phenol are mixed with 133 parts of oleylaldehyde and to this mixture there are added at 10° C. to 15° C., while stirring, 15 parts of hydrochloric acid of 37 per cent strength. The working up is carried out as described in Example 1. A viscous oil having a yellowish-brown color is obtained.

(3) 220 parts of crude cresol are mixed with 530 parts of oleylaldehyde and the mixture is diluted with 500 parts of ether. To this solution there are added at 10° C. to 15° C. about 300 to 400 parts of chlorosulfonic acid. When the reaction mixture has become soluble in water the solvent is eliminated under reduced pressure and the reaction mixture is freed from the excess of sulfuric acid by washing it with a small quantity of water. In order to obtain the sodium salt of the new sulfo acid, this acid is diluted with about 500 parts of water, exactly neutralized with caustic soda solution and evaporated to dryness.

The free acid as well as the sodium salt have a strong foaming action in an aqueous solution and have a considerable wetting, dispersing and cleansing power.

(4) The mixture named in Example 3 of 220 parts of crude cresol with 530 parts of oleylaldehyde is stirred at about 50°C. to 70°C. without applying a diluent with 500 parts of sulfuric acid (monohydrate). On standing the reaction mixture separates into two layers one of which is the viscous reaction product and the other constitutes the excess of the dilute sulfuric acid. The sulfo acid or the sodium salt thereof, respectively, is obtained in the pure state according to the process described in Example 3.

I claim:

The product obtained by condensing crude cresol with oleylaldehyde in the presence of chlorosulfonic acid, said product being soluble in water while decreasing the surface tension.

GERHARD BALLE.